(12) United States Patent
Chen et al.

(10) Patent No.: US 8,759,423 B2
(45) Date of Patent: Jun. 24, 2014

(54) STABILIZED DEFOAMERS FOR CEMENTITIOUS COMPOSITIONS

(71) Applicant: W. R. Grace & Co.-Conn., Columbia, MD (US)

(72) Inventors: Ying Chen, Arlington, MA (US); Lawrence L. Kuo, Acton, MA (US); Ara A. Jeknavorian, Chelmsford, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 13/865,700

(22) Filed: Apr. 18, 2013

(65) Prior Publication Data

US 2013/0281577 A1     Oct. 24, 2013

Related U.S. Application Data

(60) Provisional application No. 61/635,936, filed on Apr. 20, 2012.

(51) Int. Cl.
*C04B 16/04*     (2006.01)

(52) U.S. Cl.
USPC .............................................. 524/5; 524/493

(58) Field of Classification Search
USPC .................................................. 524/5, 493
See application file for complete search history.

(56) References Cited

U.S. PATENT DOCUMENTS

| | | | |
|---|---|---|---|
| 4,328,131 A | 5/1982 | Carson et al. |
| 4,761,183 A | 8/1988 | Clarke |
| 5,618,522 A | 4/1997 | Kaleta et al. |
| 5,858,279 A | 1/1999 | Lunski et al. |
| 6,165,262 A | 12/2000 | Kino et al. |
| 6,277,797 B1 | 8/2001 | Glenn, Jr. et al. |
| 6,569,924 B2 | 5/2003 | Shendy et al. |
| 6,616,755 B1 | 9/2003 | Levy et al. |
| 6,644,405 B2 | 11/2003 | Vijn et al. |
| 6,855,681 B1 | 2/2005 | Ness et al. |
| 6,875,801 B2 | 4/2005 | Shendy et al. |
| 7,559,369 B2 | 7/2009 | Roddy et al. |
| 7,666,327 B1 | 2/2010 | Veedu |
| 7,744,690 B2 | 6/2010 | Durst et al. |
| 7,784,542 B2 | 8/2010 | Roddy et al. |
| 7,806,183 B2 | 10/2010 | Roddy et al. |
| 2002/0107310 A1 | 8/2002 | Shendy et al. |
| 2003/0050379 A1 | 3/2003 | Shih et al. |
| 2003/0187101 A1 | 10/2003 | Shendy et al. |
| 2004/0039088 A1 | 2/2004 | Greenwood et al. |
| 2004/0096469 A1 | 5/2004 | Lewis et al. |
| 2004/0224869 A1 | 11/2004 | Lane et al. |
| 2006/0201392 A1 | 9/2006 | Piazza |
| 2007/0039516 A1 | 2/2007 | Bandoh |
| 2008/0280786 A1 | 11/2008 | Reddy et al. |
| 2011/0272142 A1 | 11/2011 | Lewis et al. |
| 2012/0031308 A1 | 2/2012 | Fradera |

FOREIGN PATENT DOCUMENTS

| | | |
|---|---|---|
| WO | 0196512 | 12/2001 |
| WO | WO2006129121 | 12/2006 |
| WO | 2011023199 | 3/2011 |

OTHER PUBLICATIONS

Thomas, Form PCT/ISA/210, International Search Report for PCT/US2013/037154, dated Sep. 6, 2013, 2 pages.
Thomas, Form PCT/ISA/237, Written Opinion of the International Searching Authority for PCT/US2013/037154, dated Sep. 6, 2013, 9 pages.

*Primary Examiner* — John Uselding
(74) *Attorney, Agent, or Firm* — Craig K. Leon

(57) ABSTRACT

The present invention discloses additive compositions, cementitious compositions, and methods for controlling air in cementitious compositions in which colloidal nano-particles are used for stabilizing a water-dispersible defoamer within a cement-dispersant-containing aqueous additive formulation for modifying hydratable cementitious compositions such as cement or concrete.

17 Claims, No Drawings

STABILIZED DEFOAMERS FOR CEMENTITIOUS COMPOSITIONS

FIELD OF THE INVENTION

This invention relates to air management in hydratable cementitious materials, and more particularly to the use of colloidal particles to stabilize water-dispersible defoamers in a cement-dispersant-containing aqueous solution for use in hydratable cementitious compositions.

BACKGROUND OF THE INVENTION

It is known that a certain amount of entrained air can improve the durability of concrete, a brittle material, by increasing resistance to degradation arising from freeze-thaw cycling. The nature and extent of air entrainment in concrete must be carefully controlled, however, because excessively large or unevenly spaced air voids can lead to loss of freeze-thaw durability and compressive strength. Air entraining agents, such as rosins acid and anionic surfactants, are commonly used to control the size and spacing of air voids within the cementitious mix.

Water-reducing cement dispersing admixtures, particularly so-called "superplasticizers," are known to entrain excessive air in concrete slurries. Air detrainers ("defoamers") are used to correct this problem.

Defoamers with high hydrophobicity have limited solubility in water and are not easily incorporated into aqueous solutions, which, for the most part, comprise the water-reducing admixture compositions. This hydrophobicity tends to destabilize the aqueous product and fosters separation of components. It requires that the water-reducing cement dispersant and defoamer be constantly stirred to prevent separation, or that they be stored in separate tanks and mixed just before use.

In view of the above, new compositions and methods for incorporating defoamers and cement dispersing water-reducers are needed in the cement and concrete industries.

SUMMARY OF THE INVENTION

In surmounting the prior art disadvantages, the present invention provides a novel and inventive additive composition and method for controlling air in cementitious compositions having one or more water-reducing cement dispersants.

Advantages of present invention include improved additive (admixture) formulation storage life span, and consistent defoamer quality in terms of obtaining suitable air void sizing and spacing for improved freeze-thaw durability. The present invention, moreover, avoids the need to mix the liquid additive before introducing it into the cement or concrete.

An exemplary stable additive composition of the present invention comprises: (a) at least one water-dispersible defoamer having polyalkylene oxide groups; (b) at least one polycarboxylate cement dispersant (e.g., water reducer) having polyethylene oxide groups, polypropylene oxide groups, or mixture thereof; and (c) colloidal nano-particles having an average size of 8-150 nanometers and being selected from the group consisting of silica, alumina, zinc oxide, tin oxide, cerium oxide, zirconia, and mixtures thereof.

The present invention also provides cement compositions and methods for modifying cement compositions using the above-described components. An exemplary cement composition of the invention comprises a hydratable cementitious binder and the aforesaid components (a), (b), and (c).

Other advantages and features of the invention are described in further detail hereinafter.

DETAILED DESCRIPTION OF EXEMPLARY EMBODIMENTS

The present invention provides additive compositions for modifying hydratable cementitious compositions, such as cement and concrete, as well as cementitious compositions and methods for modifying such compositions. Thus, an exemplary additive composition of the invention comprises: (a) at least one water-dispersible defoamer comprising polyalkylene oxide; (b) at least one polycarboxylate cement dispersant (e.g., water reducer, superplasticizer) having polyethylene oxide groups, polypropylene oxide groups, or mixture thereof; and (c) colloidal nano-particles having an average size of 8-150 nanometers and being selected from the group consisting of silica, alumina, zinc oxide, tin oxide, cerium oxide, zirconia, and mixtures thereof (and of these silica and alumina are most preferred).

The colloidal nano particles are preferably operative to stabilize the at least one water dispersible defoamer within an aqueous environment in the presence of at least one polycarboxylate cement dispersant.

The term "cement" as used herein includes hydratable cement which is produced by pulverizing clinker consisting of hydraulic calcium silicates and one or more forms of calcium sulfate (e.g., gypsum) as an interground additive. "Mortars" are cement pastes formed with water and additionally including fine aggregate (e.g., sand); while "concretes" are mortars which additionally include coarse aggregate (e.g., crushed stones or gravel). The term "cementitious" refers to materials that include or comprise cement (e.g., Portland cement) or which otherwise function as a binder to hold together fine aggregates (e.g., sand), coarse aggregates (e.g., crushed gravel), or mixtures thereof. Typically, Portland cement is combined with one or more other supplementary cementitious materials ("SCMs") and provided as a blend. SCMs may include limestone, hydrated lime, fly ash, granulated blast furnace slag, and silica fume, or other materials commonly included in such cements. Cementitious materials may therefore include one or more SCMs in an amount of 0%-100%, and more preferably in an amount of 10%-60%, based on total dry weight of cementitious material.

The term "hydratable" as used herein is intended to refer to cement or cementitious materials that are hardened by chemical interaction with water. Portland cement clinker is a partially fused mass primarily composed of hydratable calcium silicates. The calcium silicates are essentially a mixture of tricalcium silicate ($3CaO \cdot SiO_2$ "$C_3S$" in cement chemists notation) and dicalcium silicate ($2CaO \cdot SiO_2$, "$C_2S$") in which the former is the dominant form, with lesser amounts of tricalcium aluminate ($3CaO \cdot Al_2O_3$, "$C_3A$") and tetracalcium aluminoferrite ($4CaO \cdot Al_2O_3 \cdot Fe_2O_3$, "$C_4AF$"). See e.g., Dodson, Vance H., *Concrete Admixtures* (Van Nostrand Reinhold, New York N.Y. 1990), page 1.

The term "additive" as used herein means and includes additives added at the cement manufacturing plant before, during, and/or after clinker is ground into cement; and it also means and includes "admixtures," a term of art which refers to materials other than cement, water, and aggregates used for making mortar, concrete, and other cementitious materials.

The term "water-dispersible" means that when the defoamer is mixed into water, it will be uniformly distributed within the aqueous solution and will form a stable, milky white dispersion. The water-dispersibility of a defoamer can be described as a function of turbidity. At 0.2% based on total weight of aqueous carrier composition, water-dispersible defoamers contemplated for use in the present invention should have a turbidity value higher than 50 NTU as measured by HACH™ 2100N turbidimeter at 20 degrees Centigrade under NTU mode with "RATIO ON: Auto" option. Such 0.2% defoamer dispersion is preferably stable for at least one hour; and, more preferably, it should be stable for at least four hours. The turbidity of the stable defoamer dispersion should not increase or decrease more than 25% compared to its turbidity value immediately after mixing.

Exemplary defoamers contemplated for use in the present invention comprise an ethoxylated and/or propoxylated alcohol, fatty alcohol, alkyl amine, alkyl polyamine or fatty carboxylic acid. The end group of such defoamer can be hydrogen, a $C_1$ to $C_{30}$ linear or branched, aromatic or aliphatic, alkyl group. The poly(alkylene oxide) portion of this defoamer can be random or block ethylene oxide ("EO") and/or propylene oxide ("PO") units, for example, EO-PO-EO triblock, EO-PO diblock, etc.

Exemplary polycarboxlate cement dispersants contemplated for use in the present invention include dispersants that are conventionally used in cements and concretes and that are generally commercially available in the form of liquid aqueous compositions. Preferred polycarboxylate dispersants are comb polymers having polyethylene oxide groups, polypropylene oxide groups, or both such groups, which are preferably attached as pendant groups. The concentration of the at least one polycarboxylate cement dispersant within the additive or admixture composition is preferably 5% to 60%, and more preferably between 12% to 40%, based on weight of the aqueous composition. Polycarboxylate dispersants suitable for purposes of the present invention are available from Grace Construction Products, Massachusetts, under the trade name "ADVA®" as well as available from other commercial sources under various other trade names, which polycarboxlate cement dispersants are typically sold as concrete admixtures.

The term "colloidal" refers to the characteristic or ability of these nano-particles to become microscopically dispersed uniformly within an aqueous environment such as water, or a water-based, liquid-dispensable cement additive formulation product or concrete admixture formulation product.

Materials believed by the present inventors to be suitable for use as inorganic colloidal nano-particles are generally available. For example, colloidal silica is commercially available from W. R. Grace & Co.-Conn., under the trade name LUDOX®. As another example, colloidal silica nano-particles in aqueous solution are available from Nissan Chemical America Corporation (Houston, Tex.) under the trade name SNOWTEX®. As a further example, colloidal dispersions of inorganic oxides are available from Nyacol Nano Technologies, Inc., under the trade name NEXSIL™ and NYACOL®. These and similar products are believed to be suitable for making aqueous formulations containing inorganic colloidal nano-particles. The present inventors believe that these can function to stabilize one or more water-dispersible defoamers in the presence of water-soluble cement dispersants.

Preferably, the average size of the colloidal nano-particles is 8-150 nm, more preferably 15-120 nm, and most preferably 25-60 nm. Average particle size can be measured by dynamic light scattering method using a Malvern Zetasizer (Malvern Instruments). The nano-particles discussed here were measured at 25° C.±0.1° C. using a Malvern Zetasizer Nano-S instrument (model ZEN1600). Colloidal particle samples are prepared by diluting the original solution to 5 wt % using distilled water, and the corresponding Z-average size was obtained.

Aqueous cement additive formulation and concrete admixture formulation can be made by combining the "water-dispersible" defoamer, colloidal nano-particles and polycarboxylate cement dispersant upon mixing. The distribution of the water-dispersible defoamer within such formulations remains unchanged over a wide range of temperatures and for an extended period of time.

The additive compositions are water-based (aqueous) liquids that may be dispensed (e.g., pump-metered) in liquid form.

It is preferred that the colloidal nano-particles be mixed with the at least one water-dispersible defoamer prior to addition of the at least one polycarboxylate cement dispersant.

In exemplary additive compositions of the invention, the weight ratio of component (a) to component (b) based on solid content is from 1:1000 to 1:2; and the weight ratio of component (a) to component (c) based on solid content is 1:0.5 to 1:10. In other exemplary compositions, the weight ratio of component (a) to component (b) based on solid content is from 1:200 to 1:4; and the weight ratio of component (a) to component (c) based on solid content is 1:1.25 to 1:3.

Exemplary additive compositions of the invention are premixed and provided in the form of water-based, liquid-dispensable compositions that comprise water in an amount sufficient for the components (a) through (c) to form an aqueous solution wherein the concentration of the water-dispersible defoamer of component (a) is preferably from 0.05% to 2.5% based on total weight of the aqueous solution, and, more preferably, from 0.1% to 1% based on the weight of the aqueous solution (which also contains the water-soluble cement dispersant of component (b)).

Further exemplary additive compositions of the present invention may further comprise at least one conventional cement additive or concrete admixture. For example, the additive composition may further comprise at least one water-soluble defoamer. The additive composition may further comprise concrete set accelerators, such as inorganic salts (e.g., $CaCl_2$ and $Ca(NO_3)_2$).

Exemplary cementitious compositions of the invention comprise at least one cementitious binder and the additive composition of claim 1. Exemplary methods of the invention for modifying hydratable cementitious compositions comprise: mixing together at least one cementitious binder and the additive composition.

While the invention is described herein using a limited number of embodiments, these specific embodiments are not intended to limit the scope of the invention as otherwise described and claimed herein. Modification and variations may be apparent to persons having ordinary skill in the art in view of the exemplary embodiments disclosed herein. The following examples are given as a specific illustration of embodiments of the claimed invention. It should be understood that the invention is not limited to the specific details set forth in the examples.

EXAMPLE 1

Water-based liquid additive compositions of the invention are formulated and their stability tested as follows. The water-dispersible defoamer (designated as "defoamer A") is a non-ionic defoamer containing polyalkylene oxide. Turbidity of defoamer A in solution (0.2% wt. in water) was 2250 NTU (measured using HACH™ 2100N turbidimeter at 20° C. under the NTU mode with "RATIO ON: Auto" option). After four hours, this aqueous dispersion of defoamer A remained stable with a turbidity value of 2700 NTU.

Liquid admixture samples containing defoamer A, polycarboxylate cement dispersant and colloidal nano-particles were prepared as shown in Table 1 below. Stability of the samples was monitored over time at both 25° C. and 50° C. and compared to a reference sample that did not contain the colloidal particles. The admixture samples are prepared as follows: water (76.85 g) was added into a 250 ml flask, followed by defoamer A (0.70 g) and colloidal nano-particles ("NYACOL™ Al20" 5.78 g solution, 24.22 wt %). This was mixed using mechanical stirrer for 2 minutes at 300 rpm. Polycarboxylate cement dispersant (116.67 g, 60% by weight) was then added, and the mixture stirred for 10 minutes at 600 rpm to provide an admixture designated as "Ad-1-2" (See Table 1). This sample was kept in 100 ml cylinders at 25° C. and 50° C., and stability of both samples was monitored visually until phase separation occurred.

particles. Moreover, admixture samples were unstable in the absence of polycarboxylate as shown by stability data in Reference-1-2 and Reference-1-3.

EXAMPLE 2

Another additive composition of the invention was formulated and its stability tested. The defoamer used is available from BYK Additives and Instruments under the trade name "BYK®-028" and is believed to contain defoaming polysiloxanes and hydrophobic solids in polyglycol with oxirane (polyalkylene glycol). Turbidity of "BYK®-028" dispersion (0.2 wt %) in water was 110 NTU as measured using HACH® 2100N turbidimeter. This defoamer dispersion was stable at 25° C. for more than 1 hour. Admixture samples containing BYK® 028 were prepared according to Table 2 using the method described in Example 1.

TABLE 1

(Admixture Stability Test)

| Admixture Sample | Defoamer A wt % | Polycarboxylate cement dispersant wt % | Colloidal particle | | | Stability (day)[a] | |
|---|---|---|---|---|---|---|---|
| | | | Name | Size[b] (nm) | Chemical nature | wt % | 25° C. | 50° C. |
| Reference-1-1 | 0.35 | 35 | — | — | — | 0 | 5 | 1 |
| Reference-1-2 | 0.35 | 0 | NexSil ™ 20k-30 | 27.6 | Silica | 0.70 | <1 | <1 |
| Reference-1-3 | 0.35 | 0 | Ludox ™TM 50 | 25.5 | Silica | 0.70 | <1 | <1 |
| Ad-1-1 | 0.35 | 35 | NexSil ™ 20k-30 | 27.6 | Silica | 0.70 | 46 | 27 |
| Ad-1-2 | 0.35 | 35 | Nyacol ™ Al20 | 50.9 | Alumina | 0.70 | 45 | 26 |
| Ad-1-3 | 0.35 | 35 | NexSil ™ 125 | 122 | Silica | 0.70 | 18 | 14 |
| Ad-1-4 | 0.35 | 35 | NexSil ™ 125A | 118 | Silica | 0.70 | 21 | 14 |
| Ad-1-5 | 0.35 | 35 | Ludox ™HS 40 | 21.3 | Silica | 0.70 | 25 | 3 |
| Ad-1-6 | 0.35 | 35 | Ludox ™TM 50 | 25.5 | Silica | 0.70 | 25 | 15 |
| Ad-1-7 | 0.35 | 35 | Ludox ™TM 50 | 25.5 | Silica | 1.75 | 41 | 24 |
| Ad-1-8 | 0.70 | 35 | Ludox ™TM 50 | 25.5 | Silica | 1.40 | 28 | 10 |

[a]Stability is represented by the number of days before phase separation was visually detected.
[b]Z-average diameter size measured by MALVERN ™ Nanosizer device.

The data in Table 1 (Ad-1-1 to Ad-1-8) indicates that addition of colloidal nano-particles significantly prolonged stability of admixture samples at both 25° C. and 50° C. in comparison with Reference-1-1 which did not have colloidal

TABLE 2

(Admixture Stability Test)

| Admixture Sample | BYK ®-028 defoamer wt % | Polycarboxylate cement dispersant wt % | Colloidal particle | | | Stability (day)[a] | |
|---|---|---|---|---|---|---|---|
| | | | Name | Size[b] (nm) | Chemical nature | wt % | 25° C. | 50° C. |
| Reference 2 | 0.35 | 35 | — | — | — | 0 | 4 | 2 |
| Ad-2-1 | 0.35 | 35 | NEXSIL ™20k-30 | 27.6 | Silica | 0.70 | 8 | 7 |
| Ad-2-2 | 0.35 | 35 | Ludox ™TM 50 | 25.5 | Silica | 0.70 | 13 | 12 |

[a]Stability is represented by the number of days before phase separation was visually detected.
[b]Z-average diameter size measured by MALVERN ™ nanosizer.

The data in Table 2 indicates that admixture samples containing colloidal nano-particles had longer stability at both 25° C. and 50° C. when compared to the reference sample.

EXAMPLE 3

Comparative Test

A comparative test was done using fumed silica to ascertain relative performance compared to Examples 1 and 2 above. "AEROSIL® 300" and "AEROSIL® 130" are commercial trade names for hydrophilic fumed silica, and "AEROSIL® R816" is a commercial trade name for hydrophobic fumed silica. Admixture samples containing defoamer and these fumed silicas were prepared using the previously described procedures.

TABLE 3

(Admixture Stability Test)

| Admixture Sample | Defoamer A wt % | Polycarboxylate Cement Dispersant wt % | Particle Stabilizer Name | wt % | Stability (day)[a] 25° C. | 50° C. |
|---|---|---|---|---|---|---|
| Reference 3 | 0.35 | 35 | — | 0 | 5 | 1 |
| Ad-3-1 | 0.35 | 35 | Aerosil ™ 300 | 0.70 | <1 | <1 |
| Ad-3-2 | 0.35 | 35 | Aerosil ™ 130 | 0.70 | <1 | <1 |
| Ad-3-3 | 0.35 | 35 | Aerosil ™ R 816 | 0.70 | <1 | <1 |

[a]Stability is represented by the number of days before phase separation was visually detected.

As seen in Table 3 above, admixture samples Ad-3-1 to Ad-3-3 which contained hydrophilic or hydrophobic fumed silica become unstable within a day. Compare to Reference 3, fumed silica does not improve the formulation stability.

EXAMPLE 4

Stability Test with Multiple Defoamers

Admixture samples using multiple defoamers were made and tested. Colloidal particles can also stabilize admixtures comprised of more than one defoamer, as illustrated in Table 4 below. A second defoamer (designated Defoamer B) was used which could dissolve in water under acidic condition.

Admixture formulation samples were prepared as shown in Table 4 using the following procedure: first, water (200 g) was added to a 1000 ml flask, followed by defoamer A (4.2 g) and colloidal particle "Ludox™ TM 50" (8.1 g solution, 51.83 wt %). The above mixture was mixed together using a mechanical stirrer for 4 minutes at 300 rpm (this is designated as premix 1). Water (25.1 g) and defoamer B (4.2 g) were added into another flask (50 ml), and pH of solution was adjusted to around 2-3 using acetic acid. The solution was subsequently mixed using mechanical stirrer for 2 minutes at 300 rpm (and this was designated premix 2). Into premix 1, polycarboxylate dispersant (350 g, 60 wt %) was added and mixed using mechanical stirrer for 10 minutes at 600 rpm. Subsequently, premix 2 was added into this mix and stirred for another 5 minutes at 600 rpm (and this resultant mix is designated as sample admixture Ad-4-3 in Table 4). This admixture was kept in 100 ml cylinder both in 25° C. and 50° C., and stability was monitored visually until phase separation occurred.

TABLE 4

(Admixture Stability Test)

| Admixture | Defoamer A, wt % | B, wt % | Polycarboxylate Cement Dispersant wt % | Colloidal particle Name | wt % | Stability (day)[a] 25° C. | 50° C. |
|---|---|---|---|---|---|---|---|
| Reference 4 | 0.35 | 0.35 | 35 | — | 0 | 4 | 1 |
| Ad-4-1 | 0.35 | 0.35 | 35 | NexSil ™ 125A | 0.70 | 40 | 8 |
| Ad-4-2 | 0.35 | 0.35 | 35 | Ludox ™TM 50 | 0.70 | 40 | 39 |
| Ad-4-3 | 0.70 | 0.70 | 35 | Ludox ™TM 50 | 1.40 | 40 | 35 |

[a]Stability is represented by the number of days before phase separation was visually detected.

The data shown in Table 4 indicates that the colloidal particles prolong the stability of admixture samples containing more than one defoamer.

EXAMPLE 5

Mortar Air Test

In order to test the defoamer distribution throughout an admixture solution, mortar air tests (ASTM C185) were performed.

Admixture sample (Ad-1-6 in table 1, 500 mL) was prepared according to the method described in Example 1. Half of the admixture sample was kept in a 250 mL cylinder at 25° C. for 20 days without disturbance. After 20 days, 40 ml of this sample was removed by pipette from the top layer of solution in the cylinder and designated as sample Ad-1-6 (20 d@25° C.-Top). Then 40 ml admixture was removed by pipette from the bottom layer of the solution and designated as sample Ad-1-6 (20 d@25° C.-Bottom). The other half of the admixture sample was kept in a 250 mL cylinder at 50° C. for 10 days without disturbance. Similarly, two samples were obtained separately from the top and bottom of the cylinder, and designated as sample Ad-1-6 (10 d@50° C.-Top) and sample Ad-1-6 (10 d@50° C.-Bottom).

The ASTM C185 mortar air test was performed with four admixture samples and compared to a freshly made sample of the same composition (designated as Ad-1-6 fresh) and sample reference 5 (which contained only polycarboxylate dispersant). Mortar tests were performed according to the ASTM C185 standard using the following composition: cement (350 g), sand (1400 g), admixture (1.2 g, 35 or 36 wt %) and water (217 g~250 g).

TABLE 5

(ASTM C185 Mortar Air Test)

| Admixture Sample | Defoamer A wt % | Polycarboxylate Cement Dispersant wt % | Colloidal particle Name | Colloidal particle wt % | Air, wt % |
|---|---|---|---|---|---|
| Reference 5 | 0 | 35 | 0 | 0 | 12.8 |
| Ad-1-6 (fresh) | 0.35 | 35 | Ludox ™ TM 50 | 0.70 | 4.0 |
| Ad-1-6 (20 d@25° C.-Top) | 0.35 | 35 | Ludox ™ TM 50 | 0.70 | 3.8 |
| Ad-1-6 (20 d@25° C.-Bottom) | 0.35 | 35 | Ludox ™ TM 50 | 0.70 | 2.9 |
| Ad-1-6 (10 d@50° C.-Top) | 0.35 | 35 | Ludox ™ TM 50 | 0.70 | 3.8 |
| Ad-1-6 (10 d@50° C.-Bottom) | 0.35 | 35 | Ludox ™ TM 50 | 0.70 | 4.2 |

Comparison of samples Ad-1-6(fresh), Ad-1-6(20 d@25° C.-Top), and Ad-1-6 (20 d@25° C.-Bottom) to Reference 5 indicates that after 20 days (25° C.), the admixture defoaming power remains consistent throughout the solution and is similar to a freshly made admixture sample. A similar conclusion can be drawn by comparing the data for admixture samples Ad-1-6 (fresh), Ad-1-6 (10 d@50° C.-Top), Ad-1-6 (10 d@50° C.-Bottom) to Reference 5; that is, after storing for 10 days at 50° C., the admixture defoaming power remains consistent throughout the solution and is similar to a freshly made admixture sample.

EXAMPLE 6

Concrete Air Voids Quality Test

The quality of entrained air in admixture samples containing defoamer A and the Ludox™ TM 50 colloidal particles was tested against the reference sample which did not contain the colloidal particles. Air entrained concrete mixes were formulated using: Ordinary Portland Cement A (OPC), 362 kg/m$^3$ (611 lb/yd$^3$); water, 148 kg/m$^3$ (250 lb/yd$^3$); coarse aggregate, 1038 kg/m$^3$ (1750 lb/yd$^3$); fine aggregate, 787 kg/m$^3$ (1326 lb/yd$^3$); and chemical admixtures, 0.1 wt % based on weight of cement. A conventional air-entraining agent (available from Grace Construction Products, Cambridge, Mass., under the trade name DARAVAIR® 1000) was added at a dosage required to bring the plastic air content within the range of 5%-9% by total volume based on plastic concrete. Air content of samples was tested in accordance with the ASTM C231-97. The air void quality was tested in accordance with the ASTM C457-98. The experiment results are summarized in Table 6. The recommended value to pass the ASTM C494 requirement for freeze/thaw durability is less than 0.200 mm (0.008 inches) for the spacing factor and greater than 24 mm$^{-1}$ (600 in$^{-1}$) for the specific surface.

TABLE 6

(Concrete Air Void Quality)

| | Admixture Composition | | | | Concrete | | | | |
|---|---|---|---|---|---|---|---|---|---|
| Entry | Defoamer A wt % | Polycarboxylate Cement Dispersant, wt % | Colloidal particle Name | Colloidal particle wt % | DARAVAIR ® 1000 dose (ml) | Plastic Air content (%) | Hardened Air content (%) | Specific Surface (mm$^{-1}$) | Spacing factor (mm) |
| Reference 6 | 0.35 | 35 | — | 0 | 35 | 7.3 | 6.6 | 30.6 | 0.13 |
| Ad-1-7 | 0.35 | 35 | Ludox ™ TM 50 | 1.75 | 59 | 7.6 | 5.4 | 33.5 | 0.14 |

When the reference sample (which did not contain colloidal particles) is compared to the other sample, the data in Table 6 indicates that the addition of colloidal particle does not adversely affect air void quality in the concrete mixes.

EXAMPLE 7

Concrete Air Voids Quality Test

The entrained air voids quality of admixture samples containing defoamer A and Ludox™ TM 50 colloidal particles was tested again against the reference sample which did not contain colloidal particles, and this time a different cement was used. The test procedure was the same as in Example 6, except that Ordinary Portland Cement B was used.

TABLE 7

(Concrete Air Void Quality)

| | Admixture Composition | | | | | | | |
|---|---|---|---|---|---|---|---|---|
| | Defoamer A | Polycarboxylate Cement Dispersant, | Colloidal particle | | DARAVAIR ® 1000 | Concrete Plastic Air content | Hardened Air content | Specific Surface | Spacing factor |
| Entry | wt % | wt % | Name | wt % | dose (ml) | (%) | (%) | (mm$^{-1}$) | (mm) |
| Reference 7 | 0.70 | 35 | — | 0 | 33 | 6.2 | 5.49 | 25 | 0.20 |
| Ad-1-8 | 0.70 | 35 | Ludox ™ TM 50 | 1.40 | 44 | 6.9 | 6.39 | 27 | 0.17 |

The results of this test are shown in Table 7. When the reference sample (which did not contain colloidal particles) is compared to the other sample, the data in Table 7 indicates that the addition of colloidal particles does not adversely affect air void quality.

EXAMPLE 8

Another additive composition of the invention was formulated and its stability tested. This admixture is a type E concrete accelerator.

TABLE 8

(Admixture Stability Test)

| Admixture Sample | Defoamer A wt % | Calcium Nitrate wt % | Polycarboxylate cement dispersant wt % | Colloidal particle | | | | Stability (day)$^a$ | |
|---|---|---|---|---|---|---|---|---|---|
| | | | | Name | Size$^b$ (nm) | Chemical nature | wt % | 25° C. | 50° C. |
| Reference 8 | 0.4 | 38 | 4 | — | — | — | 0 | <1 | <1 |
| Ad-8-1 | 0.4 | 38 | 4 | Nyacol ™ Al20 | 50.9 | Alumina | 0.8 | 15 | 5 |

$^a$Stability is represented by the number of days before phase separation was visually detected.
$^b$Z-average diameter size measured by MALVERN ™ nanosizer.

The data in Table 8 indicates that admixture samples containing colloidal nano-particles had longer stability at both 25° C. and 50° C. when compared to the reference sample.

The foregoing example and embodiments were present for illustrative purposes only and not intended to limit the scope of the invention.

It is claimed:

1. A stable additive in aqueous carrier composition for modifying cementitious compositions, comprising: water and
   a) at least one water-dispersible defoamer comprising polyalkylene oxide, said at least one water-dispersible defoamer having a turbidity value greater than 50 NTU when measured by turbidimeter at 20° C at concentration level of 0.2% based on total weight of the aqueous carrier;
   b) at least one polycarboxylate cement dispersant having polyethylene oxide groups, polypropylene oxide groups, or mixture thereof; and
   c) colloidal nano-particles having a Z-average size of 8-150 nanometers and being selected from the group consisting of silica, alumina, zinc oxide, tin oxide, cerium oxide, zirconia, and mixtures thereof;
   said collidal nano-particles being effect to stabilize the at least one water-dispersible defoamer and the at least one polycarboxylate cement dispersant when combined within the aqueous carrier composition.

2. The additive composition of claim 1 wherein, in said component (a), the at least one water-dispersible defoamer is an ethoxylated or propoxylated alcohol, fatty alcohol, alkyl amine, alkyl polyamine, or fatty carboxylic acid.

3. The additive composition of claim 1 wherein, in said component (a), the at least one water-dispersible defoamer has an end group of hydrogen, or C1 to C30 linear or branched, aromatic or aliphatic alkyl.

4. The additive composition of claim 1 wherein, in said component (a), the at least one water-dispersible defoamer comprises random or block ethylene oxide/propylene oxide units.

5. The additive composition of claim 1 wherein said colloidal nano particles have a Z-average size of 15-120 nm.

6. The additive composition of claim 1 wherein said colloidal nanoparticles are comprised of silica, alumina, or mixture thereof.

7. The additive composition of claim 1 wherein the weight ratio of said at least one water-dispersible defoamer of component (a) to said at least one polycarboxylate cement component (b) based on solid content is from 1:1000 to 1:20; and the weight ratio of said component (a) to said component (c) based on solid content is 1:0.5 to 1:10.

8. The additive composition of claim 1 wherein the weight ratio of said at least one water-dispersible defoamer of component (a) to said at least one polycarboxylate cement dispersant of component (b) based on solid content is from 1:200 to 1:35; and the weight ratio of said component (a) to said component (c) based on solid content is 1:1.25 to 1:3.

9. The additive composition of claim 1 wherein the concentration of said at least one polycarboxylate cement dispersant is 5% to 60% based on weight of said aqueous solution.

10. The additive composition of claim 9 wherein said colloidal nanoparticles are mixed with said at least one water-dispersible defoamer prior to addition of said at least one polycarboxylate cement dispersant.

11. The additive composition of claim 1 further comprising at least one water-soluble defoamer.

12. The additive composition of claim 1 further comprising inorganic salts.

13. Cementitious composition comprising at least one cementitious binder and the additive composition of claim 1.

14. Method for modifying a hydratable cementitious composition comprising: mixing together at least one cementitious binder and the additive composition of claim 1.

15. The stable additive in aqueous carrier composition of claim 6 further comprising an accelerator.

16. The additive composition of claim 4 wherein said ethylene oxide/propylene oxide units are ethylene oxide-propylene oxide-ethylene oxide triblock or ethylene oxide-propylene oxide diblock.

17. The additive composition of claim 5 wherein said collidal nano particles have a Z-average size of 25-60 nm.

* * * * *